(12) United States Patent
Van Essen (10) Patent No.: US 8,352,185 B2
(45) Date of Patent: Jan. 8, 2013

(54) METHOD, NAVIGATION DEVICE, AND SERVER FOR DETERMINING A LOCATION IN A DIGITAL MAP DATABASE

(75) Inventor: Rob Van Essen, Amsterdam (NL)

(73) Assignee: Tomtom Global Content B.V., Eidhoven (NL)

( * ) Notice: Subject to any disclaimer, the term of this patent is extended or adjusted under 35 U.S.C. 154(b) by 525 days.

(21) Appl. No.: 12/450,660

(22) PCT Filed: Apr. 6, 2007

(86) PCT No.: PCT/NL2007/050148
§ 371 (c)(1),
(2), (4) Date: Nov. 10, 2009

(87) PCT Pub. No.: WO2008/123769
PCT Pub. Date: Oct. 16, 2008

(65) Prior Publication Data
US 2010/0106397 A1   Apr. 29, 2010

(51) Int. Cl.
*G01C 21/10* (2006.01)
(52) U.S. Cl. ............ 701/532; 701/1; 701/408; 701/461; 701/533; 340/901; 340/988; 707/770
(58) Field of Classification Search ............. 701/1, 200, 701/408, 461, 533, 532; 340/901, 988; 707/770
See application file for complete search history.

(56) References Cited

U.S. PATENT DOCUMENTS

| | | | | |
|---|---|---|---|---|
| 5,636,122 A | * | 6/1997 | Shah et al. | 701/454 |
| 5,848,373 A | * | 12/1998 | DeLorme et al. | 701/455 |
| 6,504,571 B1 | * | 1/2003 | Narayanaswami et al. | 348/231.99 |
| 6,707,421 B1 | | 3/2004 | Drury et al. | |
| 6,868,421 B1 | * | 3/2005 | Lin | 1/1 |
| 7,065,527 B2 | * | 6/2006 | McCartney et al. | 1/1 |
| 7,158,880 B2 | | 1/2007 | Geiger et al. | |
| 7,912,308 B2 | * | 3/2011 | Kuno | 382/254 |
| 7,912,880 B2 | * | 3/2011 | Klein | 701/533 |
| 2004/0104842 A1 | | 6/2004 | Drury et al. | |
| 2006/0117000 A1 | * | 6/2006 | Lulu | 707/4 |
| 2006/0277170 A1 | | 12/2006 | Watry et al. | 707/3 |
| 2008/0134257 A1 | * | 6/2008 | Oesterling | 725/68 |

FOREIGN PATENT DOCUMENTS

| | | |
|---|---|---|
| EP | 1 102 228 | 5/2001 |
| EP | 1 544 573 | 6/2005 |

OTHER PUBLICATIONS

International Search Report.

* cited by examiner

*Primary Examiner* — James Trammell
*Assistant Examiner* — McDieunel Marc

(57) ABSTRACT

A method is described for locating a destination in a digital map database using a query. If the query does not find the destination, the method queries a second, more recently updated, database for the destination. If a destination is found in second database, then the location of the destination that was found is used to find a destination in the original database that is nearby to the location of the destination found in second database.

14 Claims, 5 Drawing Sheets

METHOD, NAVIGATION DEVICE, AND SERVER FOR DETERMINING A LOCATION IN A DIGITAL MAP DATABASE

TECHNICAL FIELD

The present invention relates to a method for determining a location in a first digital map database based on a query. The invention further relates to a server and a navigation device arranged for the method. The invention further relates to a system comprising such a server and such a navigation device. The invention further relates to a computer program when loaded on a computer arrangement, is arranged to perform such a method, and a data carrier comprising such a computer program.

BACKGROUND

Historically, maps were printed on paper or other non-modifiable, non-interactive media. There were essentially two forms of recourse when a map needed modification: 1) to enter a correction by hand on the paper copy; or 2) to reprint the map with the correction made on the original. Manual corrections are time-intensive, particularly for multiple modifications, and by definition do not update any of the other outstanding copies of the map. The option of reprinting the map is expensive and also an impractical way to respond to frequent modifications.

In the current age, we have databases, documents and maps in digital, electronic formats, capable of being updated as desired and able to respond to a selected range and type of operator input and to produce operator-requested output. Many electronic documents and electronic databases in common usage today comprise information related to geographic location(s). Indeed, it is not necessarily easy to think of a class of electronic documents or a class of electronic databases that does not at least occasionally incorporate some form of geographically related information.

One example of electronic databases that is relevant to certain embodiments of the invention is geospatial databases, known for convenience and intuitive comprehensibility as electronic maps or digital map databases. In the current computer age, maps have evolved well beyond their centuries-old status as static paper depictions of a non-adjustable data set as recorded at one particular time. For simplicity, much of the discussion below refers to electronic maps, although the points made also apply to electronic documents and electronic databases other than maps. In this application, the term digital map database is used to denote all kinds of electronic and digital maps.

One of the great benefits of a digital map database over a traditional paper-based map is its inherent flexibility and ability to portray large amounts of data. Paper maps are necessarily limited in the amount and type of information they can portray, within the constraints of their physical formats. Paper maps are also difficult to update.

Digital map databases do not suffer from these problems. While earlier digital maps may have seemed merely like a scanned version of the paper product, today's modern digital map databases are much more powerful. Unlimited amounts of information can be included in the map and either displayed, or not displayed, depending on the wishes of the user.

Today's digital map databases, also known as electronic maps, can allow for regular modification of data points included in the digital map database as well as active user selection of desired geographic features of interest. As new information arises, of a type specifically relevant to a map of interest or a point of interest in the map the map can be quickly updated to reflect changes or corrections to all or just a small subset of locations.

Today's digital map databases, also known as electronic maps are being made or updated in a manual process at a map production site. After the compilation or updating process has been finalized, the digital map database is released. After the release the digital map database or a part thereof goes in a conversion or compilation process resulting in a digital map product which can be used by a certain application (such as a mobile navigation device). Whereas updating the digital map database in the production site is a well known process, updating the digital map database for the application is more complicated. As a consequence, most of the digital map database updating currently takes place at the production site after which the release and conversion process follows leading to a complete application digital map database containing the updated information. This is a cumbersome process. In an alternative process the updates are made at the production site and portions of the updated digital map database are transferred to the application digital map database and replace the outdated portions there. Such a process is generically referred to as advanced map updating.

Different ways of advanced map updating exist and have been prototyped. These include incremental updating in which the individual map updates are communicated to a system deploying the map in an application and integrated in the map and regional updating in which a subset of the map coverage is completely replaced by a more current version of that subset or other forms of partial updates.

In practise these methods however are not applied frequently due to their complex technical nature. As a result, in the current market place map database providers publish at regular interval updated versions of the map database products sold earlier. In other words, the user can update the map database he uses by exchanging it for a newer version. Due to the costs of making these updates available, updates are only supplied at relatively long intervals and purchased at even longer intervals.

Another way to bypass the complex solution of advanced map updating at the application has been found in another system architecture. In this architecture the map database is no longer present on the navigation device but present on a central server with which the application connects via a wireless medium. Because in this architecture, only one database needs to be updated which can be accessed relatively easy, the problem of updating is less complex. However, this architecture also has disadvantages which have prevented large scale adoption in the market place so far. For instance, the remote map database always needs to be accessible for the navigation device, demanding reliable and expensive communication systems for ensuring communication between the navigation device and the map database. Such communication systems may have difficulties operating successfully in situations involving heavy weather or in remote areas, such as an isolated area outside the range of for instance a telephone antenna. Also, a relatively high amount of data will be transmitted, which may be relatively expensive for a user.

The number of systems in the market with this architecture is still small and it is generally associated with the mobile phone market rather than with the in-car or personal navigation market which are the well developed markets of map databases and which are addressed by the present invention.

As a consequence, most if not all map databases in the market are not updated or updated with very long intervals.

U.S. Pat. No. 7,158,880 describes a navigation system that computes driving directions from a starting position to a destination position based on a basic navigation database initially stored in the navigation system and supplemental navigation data received from a remote location. U.S. Pat. No. 7,158,880 therefore described a navigation system using incremental updating of the digital map database stored in the navigation system.

It is an object to provide a system and method that at least partially overcomes the disadvantages associated with outdated maps.

SUMMARY

According to an embodiment there is provided a method for determining a location in a first digital map database based on a query, the method comprising:
  receiving a request comprising a query for a first location not comprised by the first digital map database,
  searching for the first location in a second digital map database, and in case the first location is found in the second digital map database,
  searching for a second location nearby the first location, the second location being comprised by the first digital map database.

According to an embodiment there is provided a server for determining a location in a first digital map database based on a query, the server comprising a second digital map database stored in a memory being associated with the server, the server further comprising at least one communication device to communicate with remote devices, wherein the server is arranged to:
  receive a request comprising a query for a first location via the at least one communication device, the first location not being comprised by the first digital map database,
  search for the first location in a second digital map database, the second digital map database being stored in the memory being associated with the server, and in case the first location is found in the second digital map database,
  search for a second location nearby the first location, the second location being comprised by the first digital map database.

According to an embodiment there is provided a method for determining a location in a first digital map database based on a query, the method comprising:
  receiving a query for a first location,
  searching for the first location in the first digital map database based on the query, and in case the first location is not found in the first digital map database,
  transmitting a request comprising the query to a server having access to a second digital map database,
  receiving a reply,
and in case the reply comprises a second location
  providing the second location as the result for the query.

According to an embodiment there is provided a navigation device, having a first digital map database being associated with the navigation device, the navigation device further comprising at least one communication device to communicate with remote devices, wherein the navigation device is arranged to:
  receive a query for a first location via at least one input device,
  search for the first location in the first digital map database based on the query,
and in case the first location is not found in the first digital map database,
  transmit a request comprising the query to a server having access to a second digital map database via the at least one communication device,
  receive a reply via the at least one communication device, and in case the reply comprises a second location
  provide the second location as the result for the query via at least one output device.

According to an embodiment there is provided a system, comprising a server as described above and at least one navigation device as described above, wherein the server and the navigation device are arranged to communicate with each other via a network.

According to an embodiment there is provided a computer program, when loaded on a computer arrangement, is arranged to perform any one of the methods described above.

According to an embodiment there is provided a data carrier, comprising a computer program as described above.

BRIEF DESCRIPTION OF THE DRAWINGS

The present invention will now be discussed in more detail using a number of exemplary embodiments, with reference to the drawings, which are only intended to illustrate the present invention and not to limit its scope which is only limited by the appended claims:

DETAILED DESCRIPTION

Figure 1:
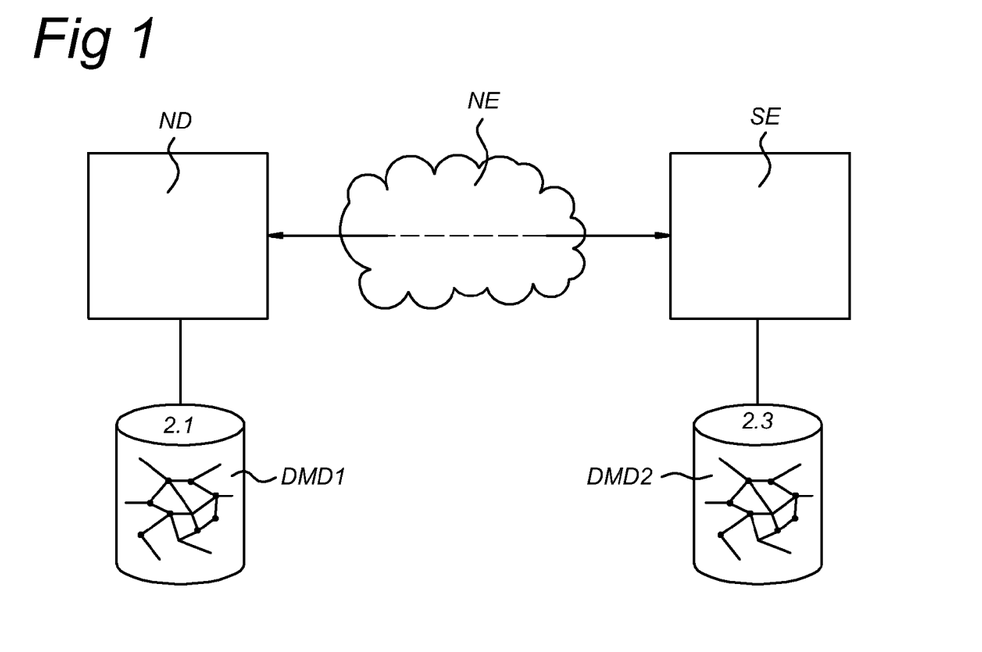
FIG. 1 schematically depicts an embodiment of a navigation device arranged to communicate with a server, FIG. 2 schematically depicts a navigation device according to an embodiment, FIG. 3 schematically depicts a server according to an embodiment, FIGS. 4a, b and c schematically depict three different versions of a digital map database respectively.

FIG. 1 schematically depict a navigation device ND, comprising or having access to a first digital map database DMD1. The navigation device ND is arranged to communicate with a server SE via a network NE. The network NE may be any type of suitable network, wired or wireless, such as the Internet, a mobile telephone communication network, RF-network etc. The server SE may be any type of computer system comprising or having access to at least one digital map database DMD2. The actions as may be performed by the navigation device ND and the server SE will be explained in more detail below.

Before discussing different embodiments in more detail, first some terms as used in this description are discussed in more detail.

Navigation Device

Figure 2:
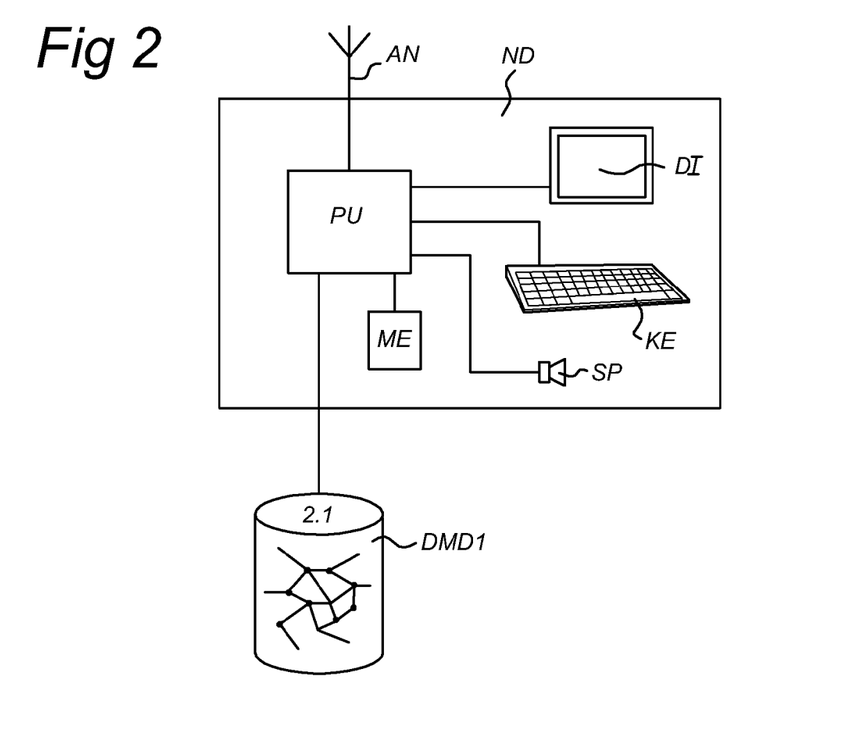

FIG. 2 schematically depicts a navigation device ND in more detail. The navigation device ND may comprise a processing unit PU, arranged to communicate with an internal or external data storage carrier like a CD or DVD or a Hard Disk and various devices enabling communication with the user, generally referred to as the Human Machine Interface (HMI). The HMI may comprise a display DI, a touch screen, a keyboard KE, a speaker SP, buttons or other units. For communication with external devices the PU may communicate via an antenna AN with other computer systems via a communication network NE, such as a mobile telephone network, a GSM-network, a UMTS-network, a RF-network, (wireless) Internet etc.

The processing unit PU is shown schematically in FIG. 2, and may comprise or have access to a memory ME that may comprise computer source code, readable and executable for the processing unit, to enable it to perform arithmetical operations thus providing it with the functionality to perform the embodiments described.

The memory ME may be any combination of a Read Only Memory (ROM), Electrically Erasable Programmable Read Only Memory (EEPROM), a Random Access Memory (RAM) and/or the like. This memory ME may also comprise a copy of (part of) the first digital map database DMD1. The memory may be used as storage memory (disks) and/or processing memory (chips).

The processing unit PU may further comprise or be arranged to communicate with
- input devices, such as keyboard KE, a mouse, a touch screen, speaker SP, and
- output devices, such as display DI, a printer, a speaker etc.

The processing unit may further comprise or be arranged to communicate with reading devices to read data carriers, such as for instance floppy disks, CD ROM's, DVD's FLASH cards, USB-sticks and the like and communication devices, such as antenna AN, arranged to communicate with other computer systems via (communication) network NE, such as a mobile telephone network, a GSM-network, a UMTS-network, a RF-network, (wireless) Internet etc.

However, it should be understood that there may be provided more and/or other memories, input devices, output devices and read devices known to persons skilled in the art. Moreover, one or more of them may be physically located remote from the processor unit PU, if required. The processor unit PU is shown as one box, however, it may comprise several processor units functioning in parallel or controlled by one main processor unit PU that may be located remote from one another, as is known to persons skilled in the art.

It is observed that the connections between different hardware elements may be physical connections, but one or more of these connections can be wireless.

The processing unit PU may be a computer system, but can be any signal processing system with analogue and/or digital and/or software technology arranged to perform the functions discussed here.

The processing unit PU may be connected to a position device PD or several positioning devices which supplies the PU with its current position or information with which it can calculate that position. The positioning system used by PD may be any kind. It can be a satellite based positioning system or global navigation satellite system (GNSS), such as the GPS-system, the European Galileo system, the Russian GLONASS, the Japanese QSSZ and the Chinese Beidou. The positioning system may also be a terrestrial positioning system, using beacons positioned on land or sea that transmit signals comprising information that may be used by a receiver to determine its position. Such positioning systems may also be referred to as absolute positioning systems.

The positioning system may be a relative positioning system arranged to detect relative movement, such as distance meters, odometers or inertial systems and/or any combination of the above. The positioning system may also be a combination of an absolute and a relative positioning system.

The processing unit PU further comprises or has access to a first digital map database DMD1. The first digital map database DMD1 may be stored in the memory described above, or may be stored in data carriers, such as for instance floppy disks, CD ROM's, DVD's, FLASH cards, USB-sticks and the like, readable by reading devices.

The processing unit PU may be arranged to display a part of the first digital map database DMD1 based on the determined current position on display DI, whereby the part of the first digital map database displayed usually comprises the current position. Also, the first digital map database DMD1 may be used to compute a route and corresponding navigation instructions for a user to navigate from a start position or the current position to a destination position. These instructions may be communicated to the user via spoken messages (e.g. "after 200 metres, turn right") using the speaker SP and/or via visual messages (e.g. an arrow indicating a right turn) using the display DI.

The processing unit PU may further be arranged to receive input from the keyboard KE, for instance indicating the start and/or destination address. Alternatively input of characters can have been realized via menu options or via the display DI which has the form of a touch screen. Alternatively, input may be made via spoken word into a microphone which is arranged to communicate with the processing unit PU and where the spoken word is translated to (machine readable) text using speech recognition algorithms that are known to one skilled in the art.

The navigation device ND is further arranged to set up a communication link with the server SE. The navigation device ND may comprise at least one communication device, such as antenna AN, arranged to communicate with other computer systems via a communication network NE, such as via a mobile telephone network, a GSM-network, a UMTS-network, a RF-network, (wireless) Internet etc. It will be understood that any other kind of communication device and/or communication network NE may be used.

Digital Map Database

The navigation device ND comprises or has access to the first digital map database DMD1. The navigation device ND may be arranged to show part of the digital map based on the current position using the display DI. The navigation device ND may also be arranged to provide navigation instructions from a start position (for instance the current position) to a destination position, to guide the user to the destination address using the digital map database DMD1 available.

It will be understood that the term digital map database as used here does not necessarily refer to a database structure in the traditional way, i.e. does not imply relational structure between the database entries or a database manager coordinating the database. The digital map database as used here refers to any set of geospatial information, regardless of the exact way the information is structured.

Digital map databases DMD, also known as geospatial databases, navigation maps or electronic maps, are known in the prior art. Digital map databases DMD in common usage today may comprise a set of geospatial points and a set of vectors, representing (parts of) roads or other linear geographic objects or the boundary of an area object, connecting geospatial points. Digital map databases may contain information related to geographic location(s) of objects like roads but also other objects with a geographic position, such as points of interest (museum, restaurant), (underground) parkings, tunnels, bridges and the like and additional information about these objects like street names, access restrictions, maximum allowable driving speed, bridge heights, telephone numbers of POI's etc. (POI: point of interest). In addition, digital map databases may contain areas with corresponding information like administrative areas, countries, land cover units like woods and pasture areas. Also 3 dimensional representations of the terrain, of buildings or of land marks may be contained. In this application, the term digital map database DMD is used to denote all kinds of electronic and digital maps. The digital map database DMD may further also comprise information about type of environment (urban, rural, forest, agriculture) and the like.

The digital map database DMD may be used to compute navigation instructions to guide a user to a destination, as mentioned above. Depending on the current position of the user as determined by the positioning device PD, a part of the digital map database DMD may be displayed on a display.

Also, 3D digital map databases 3DMD may be provided comprising three dimensional information, for instance about objects such as buildings, trees, rocks, mountains, tunnels, (underground) parkings etc. Such a 3D digital map database 3DMD may comprise information about the position of objects including the horizontal and vertical dimensions of such objects. The 3D digital map database 3DMD may also comprise information about the shape of a building and its roof.

Server

The server SE as depicted in FIG. 1 may be any kind of suitable computer arrangement as is known to a skilled person. The server SE is shown in more detail in FIG. 3.

Figure 3:
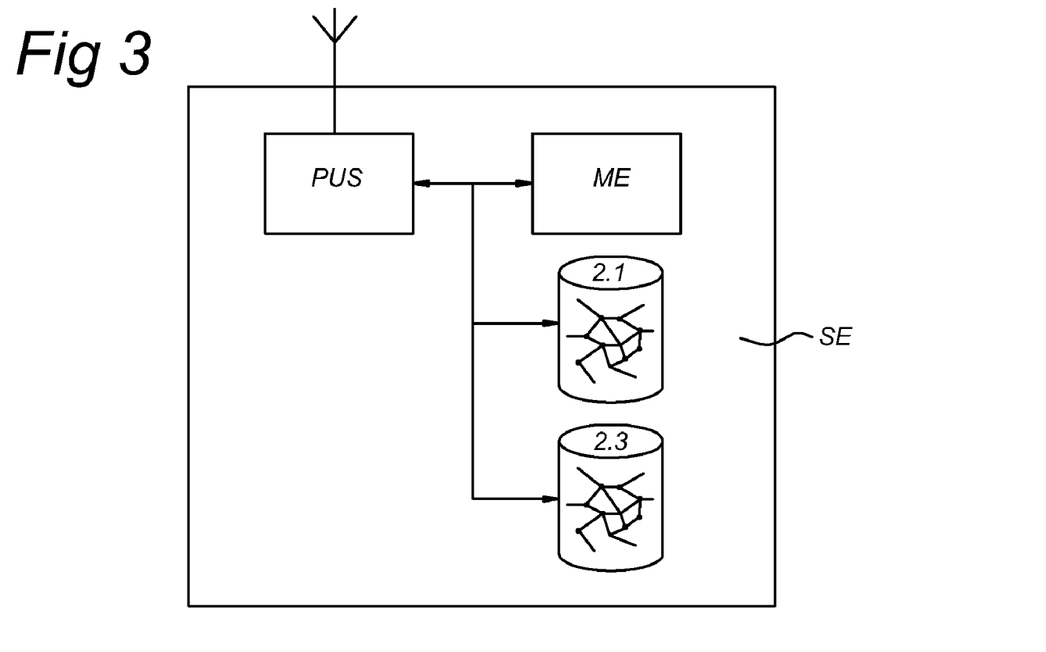

The server SE may comprise a processor unit PUS arranged to read and execute computer source code stored in a memory ME, providing the server SE with the functionality as described in the embodiments.

The memory ME may be any kind of suitable memory or combination of different memories, such as a tape unit, hard disk, a Read Only Memory (ROM), Electrically Erasable Programmable Read Only Memory (EEPROM) and a Random Access Memory (RAM). The memory may be used as storage memory (disks) and/or processing memory (chips).

The server SE may comprise or have access to a second digital map database DMD2 and, possibly to the first digital map database DMD1 as well. The first and second digital map databases DMD1, DMD2 may be stored in the memory ME described above, or may be stored in other data carriers, such as for instance floppy disks, CD ROM's, DVD's FLASH cards, USB-sticks and the like, readable by reading devices. The first and second digital map databases DMD1, DMD2 are depicted as separate units in FIG. 3, but it will be understood that the first and second digital map databases DMD1, DMD2 may also be comprised in the memory ME.

The server SE may further be arranged to set up a communication link with at least one navigation device ND. The server SE may comprise at least one communication device, such as antenna AN, arranged to communicate with other computer systems via a communication network NE, such as via a mobile telephone network, a GSM-network, a UMTS-network, a RF-network, (wireless) Internet etc.

In normal circumstances, the embodiments as described here are performed using a mobile navigation device ND comprising a first digital map database DMD1 which has, therefore opening a wireless communication link to the server SE. However, the embodiments as described here may also be performed using a navigation device ND comprising a first digital map database DMD1 at home or in the office which has a wired or wireless communication link to the server SE and which is, used to compute and possibly print a set of navigation instructions to a certain destination. In such a case, the navigation device may be arranged to open a wired communication link to the server SE. According to this last example, the navigation device does not necessarily comprise an absolute or relative positioning system, as the user may simply input its current position.

It will be understood that any other kind of communication device and/or communication network NE may be used. The server SE may also be part of a wired network like a local area network of wired internet.

Network/Communication Link

The navigation device ND and the server SE as shown in FIG. 1 are arranged to communicate with each other via network NE. As already indicated above, the network NE may be any kind of network NE, such as the (wireless) Internet, a mobile telephone communication network, a RF-network etc.

The communication link between the navigation device ND and the server SE may use an IP protocol or any other protocol over GPRS or any other communication link.

The communication link may be established via wireless internet, where the navigation device ND is arranged to set up the communication link with the server SE using a web address. This web address is the address of the server SE.

Embodiments

According to an embodiment, the navigation device ND is provided comprising or having access to the first digital map database DMD1. The navigation device ND is arranged to set up a communication link via the network NE with the server SE, comprising a second digital map database DMD2, which is the same or a more recent version of the first digital map database DMD1 The first digital map database DMD1 is the same or an older version (version indicator 2.1 in FIG. 1) compared to the second digital map database DMD2 (version indicator 2.3 in FIG. 1).

When a user enters a first query for a first location, based upon which nothing can be found in the first digital map database DMD1, the navigation device ND establishes a connection with the server SE and transfers the entered query for the first location together with a version indicator (2.1) of the first digital map database DMD1 to the server SE. The server then receives this request and the first location is looked up in the second digital map database DMD2. After having transferred the query, the navigation device ND or the server SE may close the connection or keep it open. If the first location is found in the second digital map database DMD2, a second location is looked up in the second digital map database DMD2 which is closest to the first location and is comprised by the first digital map database DMD1 as well as the second digital map database DMD2. The server SE opens the connection to the navigation device ND if this has been closed previously and transfers this second location back to the navigation device ND, together with possible explanatory messages to the user where it is used as an alternative location instead of the first location.

It will be understood that the embodiments described here provides important advantages. Traditional on-board navigation uses a navigation device that has a digital map database stored on it. The navigation device is therefore arranged to function autonomously, i.e. without contacting a remote server or the like. However, as described above, the digital map database may become outdated.

The embodiments described here provide a navigation solution that uses an on-board navigation technique, i.e. the navigation device has a digital map database stored locally which is used for navigation. However, in case the locally available digital map database seems no longer up-to-date, a remote digital map database is accessed to find an alternative destination. The navigation device ND computes navigation instructions and the like based on the alternative destination.

In this embodiment, the problems associated with off-board navigation systems are solved, while avoiding the problem of the complexity of incremental updating. In off-board navigation, the navigation device does not comprise a digital map database, but uses a remote digital map database stored on a server. Therefore, off-board navigation requires more data transmission between the server and the navigation device. Such a system may be relatively expensive in use. Also, it is relatively unreliable, as the off board navigation systems need a communication link for each time it is use, where the navigation systems according to the embodiments presented here, only need a communication link when an unknown destination is requested.

According to the prior art, hybrid navigation systems are known (being a mix between on-board and off-board navigation systems), as for instance described in U.S. Pat. No. 7,158, 880. However, these hybrid navigation systems are based on transmission of parts of digital map databases, providing incremental updates of the digital map database stored in the navigation system. As described above, incremental updating a digital map database also has certain drawbacks.

The embodiments described here provide a system that on the one hand does not have the problems associated with incremental updates, and on the other hand; provides a solution for out-dated digital map databases.

It is to be noted that according to the embodiments described, the computation of navigation directions is at least partially performed by the navigation device ND itself and not by a remote server.

So, according to the embodiment described here, the first digital map database DMD1 associated with the navigation device ND is not updated or replaced with a more recent digital map database DMD2. Instead, the entered and not found destination is transferred to a server SE comprising a more up-to-date second digital map database DMD2, where it is found. Subsequently, the closest location present in the first digital map database DMD1 is found in the second digital map database DMD2 and transmitted back to the navigation device ND where it can be used as an alternative for the required location. The navigation device ND will therefore not be able to indicate to the user the exact position of the requested destination, but will be able to give the user a sufficiently close approximation which in practice will be much better than reporting that the desired destination is missing from the map.

It should be noted that the desired destination is missing from the map.

The embodiments described here do not require integration of updates nor do they require path computations using more than one database which is a complex task.

The server SE may transmit a second location indicator that is close to the required destination. In addition to this, the server SE may transmit additional information, such as the distance from the second location indicator to the required destination, the direction or even some navigation instructions guiding the user from the second location indicator to the required destination.

Thus, the problem of outdated digital map databases is not solved by updating the outdated first digital map database DMD1 but by comparing the outdated first digital map databases DMD1 with a more recent second digital map database DMD2, which is located on a place where it may be kept up to date at all times, e.g. the server SE which may be owned by a manufacturer of map databases and to supply the navigation device ND with an approximation of the missing information. This approach allows the use of a relative narrow bandwidth, as relatively small amounts of data are transmitted, in particular when compared with off board navigation systems. It will be understood that this provides an advantage with respect to off-board navigation systems.

Figure 4A:
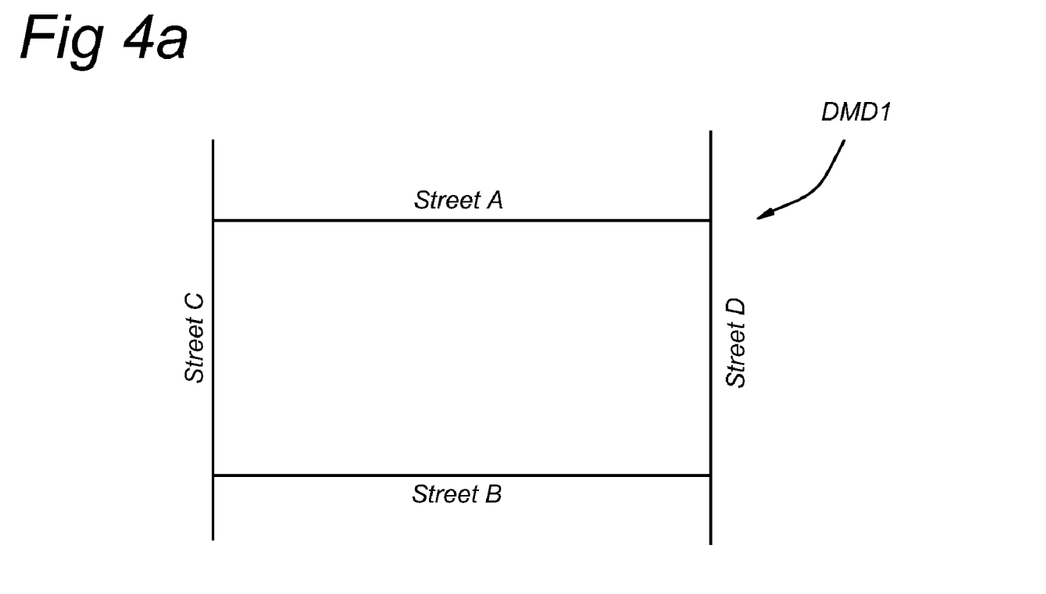

FIG. 4a schematically depicts (a part of) the first digital map database DMD1 comprising a street A, a street B, a street C and a street D. The first digital map database DMD1 may be comprised or accessible by the navigation device ND. The first digital map database DMD1 has a version indicator 2.1 and has been acquired some time ago by the user of the navigation device ND, and has not been updated recently.

The user wants to travel to a street E. Therefore, the user enters street E as a first location or destination address in the navigation device ND. The navigation device ND receives this input, for instance via keyboard KE, a touch screen or a voice command.

The navigation device ND may be arranged to respond to the input by supplying (displaying using display DI) a list of street names or other possible destination names complying with the information entered so far from which the user may select the desired first location.

However, as can be seen in FIG. 4a, street E is not present in the first digital map database DMD1. So, the navigation device ND will not present the desired street as a destination and the user will not be able to make a choice based on the presented list.

According to an embodiment, the navigation device ND is arranged to provide the user with a further option, i.e. to indicate that the desired first location is not present. This may for instance be done by providing a virtual button on the display DI, displaying "desired destination not present" that may be selected by the user.

Once the navigation device ND detects that this option is selected, it opens a window which displays the information selected so far (e.g. country, city, first characters of the street name already entered) with perhaps the possibility for the user to complete this information. After this information has been confirmed the navigation device ND opens a communication link to the server SE via network NE, and transmits a request comprising at least part of the entered information via the communication link to the server SE. After this, the communication link may be closed again, to save costs. It will be understood that the process of entering the requested destination may be an interactive process between the navigation device ND and the server SE. This will be described in more detail below with reference to FIG. 6.

The server SE may comprise the second digital map database DMD2 which is a more up-to-date version of the first digital map database DMD1.

The request which is sent by the navigation device ND may comprise the version indicator of the first digital map database DMD1 associated with the navigation device ND and the information which the user entered in his original request.

The embodiment described here is just one example. The invention relates to any information relevant for a location index in a navigation device and missing in the digital map database DMD1 in the navigation device and may be present in a more up-to-date map database in the server SE. Examples of other embodiments include missing house number ranges, missing street names, missing Points of Interest, missing address index areas etc.

The case of missing address index areas requires more attention. Two situations can be identified here. First, an address index area (e.g. a province or a county) is missing including all its content. In the second case, only the address index area is missing but the content is present. In both cases, and when the address index area is present in the second digital map database DMD2, the Server SE will provide the complete index associated with the missing area (i.e. possible sub-areas and all the street names contained). In the first case it will return the closest street present in DMD1 and in the second case it will return the requested street (assuming it was not missing due to another update problem).

If the server SE receives the request it may perform a query through the second digital map database DMD2. If the second digital map database DMD2 on the server SE is of the same version as the first digital map database DMD1 of the navigation device ND, the server SE may simply transmit a return message to the navigation device ND via the communication link, informing the navigation device ND that the server SE does not have a more recent version of the digital map database DMD1 available.

In case the server SE has a more recent version of the first digital map database DMD1, the server SE will perform a query through the second digital map database DMD2.

In case the search for the requested location is not successful by the server SE, the second digital map database DMD2 is outdated with respect to the information requested by the user (assuming that the user did not make a mistake when entering the destination). The server SE may transmit a return message to the navigation device ND via the communication link, informing the navigation device ND that the requested first location is not available. The server SE may possibly also transmit a (n alphabetical) list of destinations from the index of server SE which most closely resembles the users input. This last information is supplied to allow the user to discover that he made a typo. The user may scroll through the list and either selects a destination when he discovers it or the user can confirm the suggestion from the server SE that the location is not available.

In case the user discovers his destination in the list supplied by the server SE he selects it and confirms this through the user interface and this information is sent back to the user.

Figure 4B:
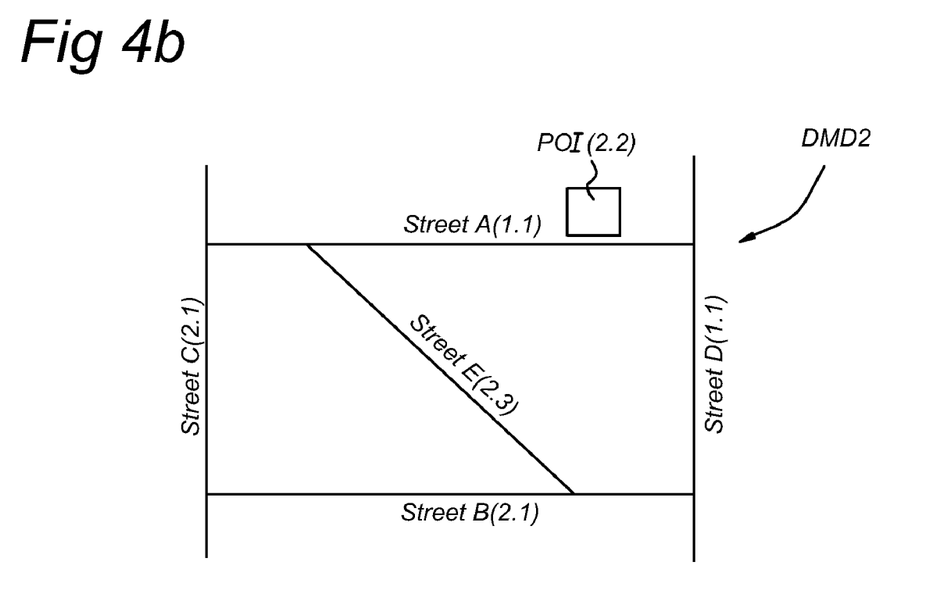

FIG. 4b schematically depicts the second digital map database DMD2 associated with the server SE, comprising the same streets as the first digital map database DMD1 plus street E, being a street in between street A and street B. In this situation, where the user is looking for E street, the query of the server SE will be successful.

Two differences can be observed between the first and second digital map database DMD1, DMD2:

(1) the objects comprised by the second digital map database DMD2 now carry the version of the digital map database in which they appeared in the digital map database for the first time (e.g. version 1.1 or 2.1), (2) Street E and a point of interest POI (e.g. a restaurant) have been added with respect to version 2.1.

In FIG. 4b it can be seen that street A and street D appeared for the first time in the digital map database DMD in version 1.1, indicated by the version indicator 1.1. Street B and C appeared for the first time in the digital map database in version 2.1, indicated by version indicator 2.1, the POI appeared in the digital map database for the first time in version 2.2, indicated by the version indicator 2.2. Finally, street E appeared just recently in the digital map database DMD2, having version indicator 2.3.

If the user selects Street E, as desired location the server SE will subsequently based upon the version indicator of the first digital map database DMD1 associated with the navigation device ND, perform a search (spatial, topological or both, as described below) and look for a second location, nearby the first location, carrying a version indicator equal to or lower than the version indicator of the first digital map database DMD1 associated with the navigation device ND. The second location subsequently is transmitted to the navigation device ND.

The navigation device ND may be arranged to indicate to the user that a second location has been found as an alternative for the missing first location, which represents an approximation which will bring the user in the vicinity of the desired destination (first location).

The navigation device ND can now simply look up the second location in the first digital map database DMD1, as it is certain that it is contained in this version.

As stated above, the server SE may perform a spatial search for the closest second location(s). According to such an embodiment, the server SE may be arranged to search for a second location that is closest to the first location 'as the crow flies'.

According to an embodiment, the server SE may also perform a topologic search for the closest second location, i.e. searching for a second location that has the shortest traveling distance or fastest traveling time to the first location, for instance taking into account topological information, such as the street connectivity, one-way streets, speed limits etc.

According to an embodiment, the server SE may also perform a spatial and a topologic search in combination. E.g. it might first select candidate destinations on basis of a spatial search and subsequently uses a topological search to select the best one.

Figure 4C:
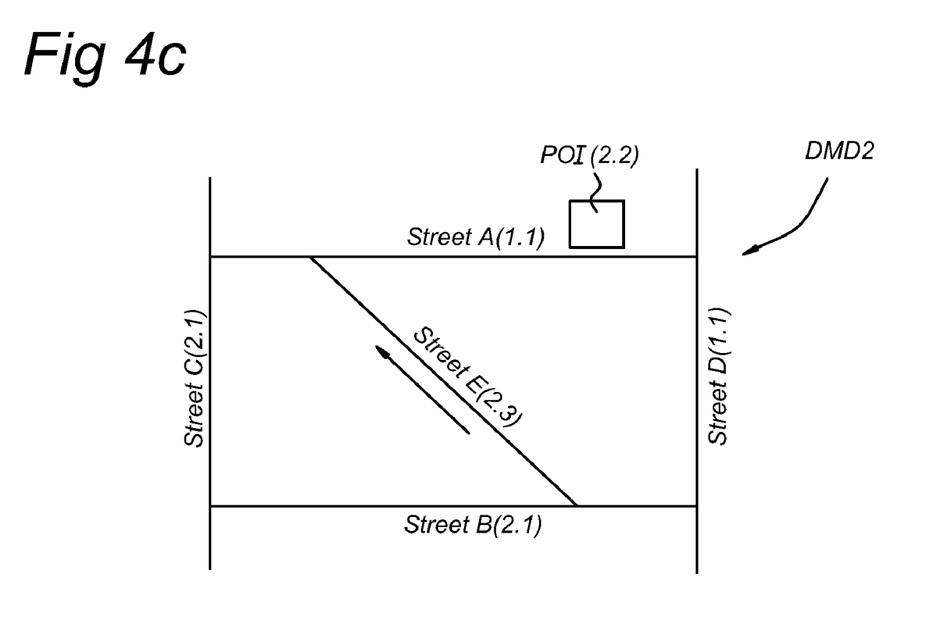

See for instance FIG. 4c, which is identical to FIG. 4b, except that street E is a one-way street as indicated with an arrow. According to this embodiment, the server SE may select street A or street B as possible second locations, as these streets substantially are at a same distance from street E and are both comprised by the first digital map database DMD1 associated with the navigation device ND. However, since street E is a one-way street, street B is selected as the second location, as it is not allowed to enter street E from street A. Therefore, the shortest traveling distance and/or the fastest traveling time to street E are obtained by first guiding the user to street B, instead of guiding the user to street A.

It will be understood that the first and second locations may also be points of interest, addresses (i.e. streets and house numbers) etc. A user may for instance input a request in the navigation device ND asking for a POI-type (e.g. restaurant) within a distance of 5 km. In case no such POI is found in the first digital map database DMD1 associated with the navigation device ND, or no satisfying result is found, the navigation device ND may be arranged to transmit a request to the server SE to see if such a POI is available in a more recent second digital map database DMD2.

According to an alternative, the items comprised by the second digital map database DMD2 do not comprise the version of the digital map database in which they appeared for the first time, but the server SE may comprise or has access to a plurality of previous versions of digital map databases DMD1.

In this last case, the server SE may first look up the first location in the second digital map database DMD2, determine the longitude/latitude information associated with this first location, and use this longitude/latitude information to look for a second location in the appropriate older first digital map database DMD1 stored in the server SE. Or, according to an alternative, the server SE may look up the first and second location in the second digital map database DMD2, and after that, check if the second location is present in the appropriate first digital map database DMD1 stored in the server SE. If so, the second location can be transmitted to the navigation device ND. If not, the server SE returns to the second digital map database DMD2 to look for an alternative second location and checks whether this location is present in the first digital map DMD1. This process is repeated until a second location is identified that is also present in the first digital map database DMD1.

Flow Diagram

Figure 5:
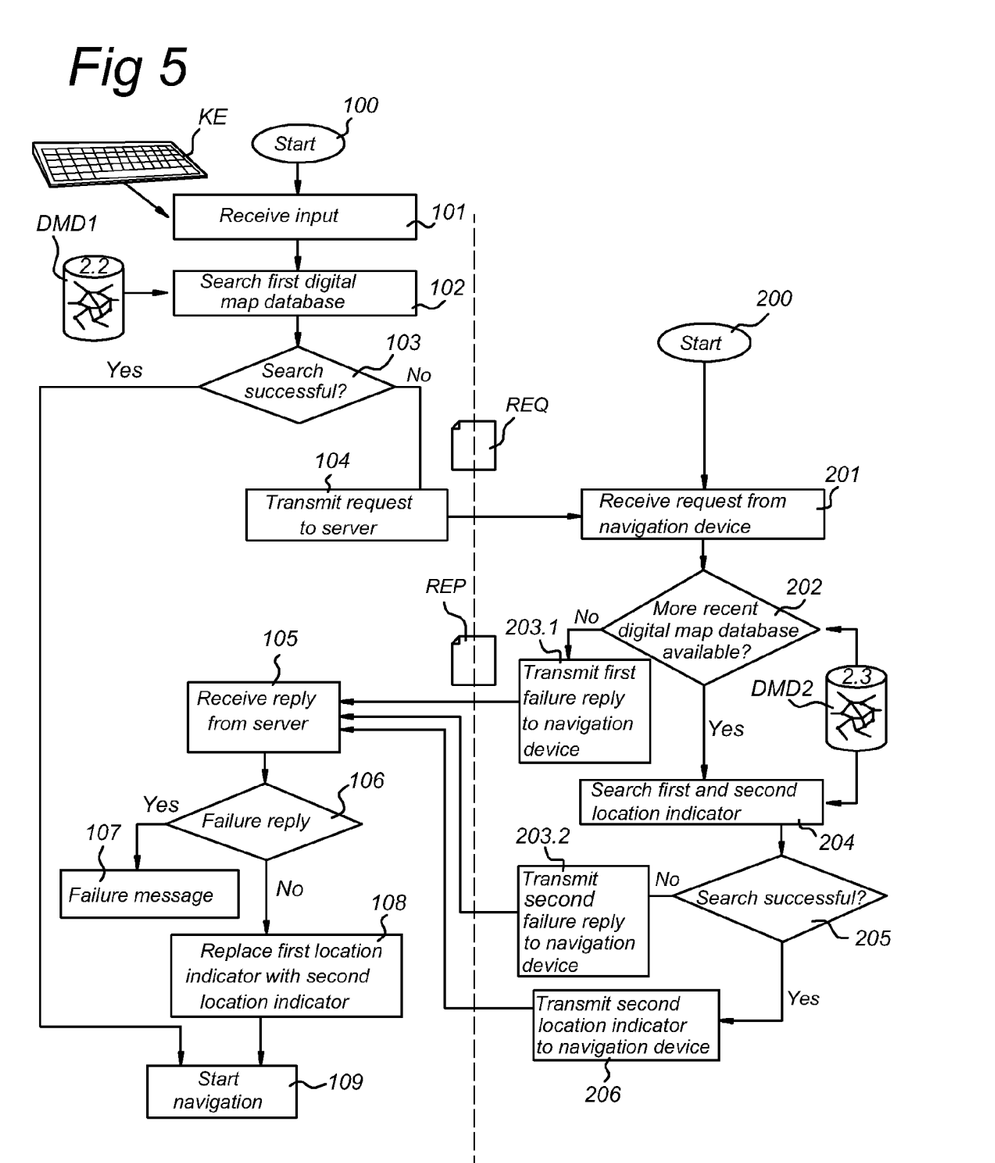
FIG. 5 depicts a flow diagram according to an embodiment.

FIG. 5 schematically depicts a flow diagram of the actions as may be performed by the navigation device ND and the server SE according to an embodiment. FIG. 5 is divided in a left part, comprising actions as may be performed by the navigation device ND and a right part, comprising actions as may be performed by the server SE. The first and second parts are separated by a dashed line.

The navigation device ND may start with action 100, which may for instance be triggered by input from the user that he wants to input a destination, for instance by clicking a corresponding button. In a next action 101, the navigation device ND is arranged to receive input.

Input may be received by the navigation device ND in many ways, such as from keyboard KE, a touch screen or a microphone. Based on the input received, the navigation device ND starts searching in the first digital map database DMD1.

It will be understood that many variations are conceivable for performing actions 101 and 102, of which some will be described in more detail below.

In action 103 it is determined that the search was successful, i.e. if a first location has been identified, most likely by the user selecting the index entry/entries related to a location, such as a destination (e.g. a street name, an address range, a combination of index area, street name and house number, a POI etc). If so, the navigation device ND proceeds with an action 109 in which the route is calculated and the guidance is started.

If in action 103 it is determined that the search of action 102 was not successful, the navigation device ND may be arranged to transmit a request REQ to the server SE. Action 103 may be performed automatically, but may also be performed after asking and receiving consent of the user for performing this action 104.

The navigation device ND may compose a request REQ comprising the input received in action 101 and the version indicator of the first digital map database DMD1 associated with the navigation device ND and may transmit the request REQ to the server SE via the network NE using appropriate communication devices, as described above.

The server SE, after being started in an action 200, is arranged to receive the request REQ from the navigation device ND using an appropriate communication device, as described above.

In a next action 202, the server SE reads the version indicator received from the navigation device ND and checks if it has a more recent second digital map database DMD2 available. If not, the server SE proceeds with executing action 203.1, by transmitting a first failure reply to the navigation device ND, for instance via a same communication link and using the same communication devices as the request REQ.

Such a first failure reply may comprise a failure message to be displayed by the navigation device ND reporting: "no more recent digital map database is on-line available".

If in action 202, a more recent second digital map database DMD2 is found, the server SE proceeds to action 204, in which the server SE starts searching for the first location in the second digital map database DMD2. If the first location is found, a second location is searched for, that is also comprised in the first digital map database DMD1 associated with the navigation device ND and is according to any argument closest to the first location.

In an action 205, it is decided that the search for the first and second location was successful. If not, for instance in case the first location has not been found in the second digital map database DMD2, the server SE continues with action 203.2, in which a second failure reply is transmitted to the navigation device ND. Such a second failure reply may comprise a failure message to be displayed by the navigation device ND reporting: "no matching location has been found on-line".

If the search has been successful, i.e. when the first location has been found in the second digital map database DMD2 and a second location is determined that is comprised by the first digital map database DMD1, the server SE proceeds with an action 206, in which a reply REP is transmitted to the navigation device ND. Such a reply REP may comprise a message to be displayed by the navigation device ND reporting: "an alternative location to replace the requested location has been found that is close to the requested destination".

After actions 203.1, 203.2 or 206, the server SE may return (not shown) to action 201 to await a new request from a navigation device ND.

Based on the above, it will be understood that the actions as may be performed by the server SE result in a reply REP that is transmitted by the server SE to the navigation device ND. This reply REP is received by the navigation device ND in an action 105. In a next action 106, the navigation device ND checks if the reply REP is a failure reply (resulting from a NO in actions 202 or 205). If so, the navigation device ND is arranged to display the failure message comprised by the reply REP, for instance using display DI.

The failure message may be the failure message comprised by the reply REP, for instance: "no more recent digital map database is on-line available" or "no matching location has been found on-line".

Of course, the failure message may also be a sound sample that is to be played via microphone M1. After action 107, the navigation device ND may return (not shown) to action 101, asking for new input from a user.

If the reply REP is not a failure reply, the navigation device ND proceeds with action 108, in which it replaces the first location (that was not present in the first digital map database DMD1) with the second location comprised in the reply REP. Simultaneously, a message comprised by the reply could be displayed: "a nearby alternative on-map location to replace the requested location has been found that is close to the requested destination".

After action 108, the navigation device ND may proceed with action 109, in which the actual navigation is started.

According to an embodiment, the server SE may after having found an acceptable second location indicator compute navigation instructions based on the second digital map database DMD2, guiding the user from the second location to the, initially desired first location. In such an embodiment, the reply REP does not only comprise the second location indicator, but also some additional navigation instructions. The navigation instruction may for instance be one text message to be played once the second location indicator has been reached: "Please proceed 150 metres Turn right on E-street and proceed up E-street 150 meters, your destination is on the right." The navigation instructions may also provide added vectors for display. Such additional navigation instructions are further described below.

Further Remarks

It will be understood that many variations to the above described embodiments are possible.

Figure 6:
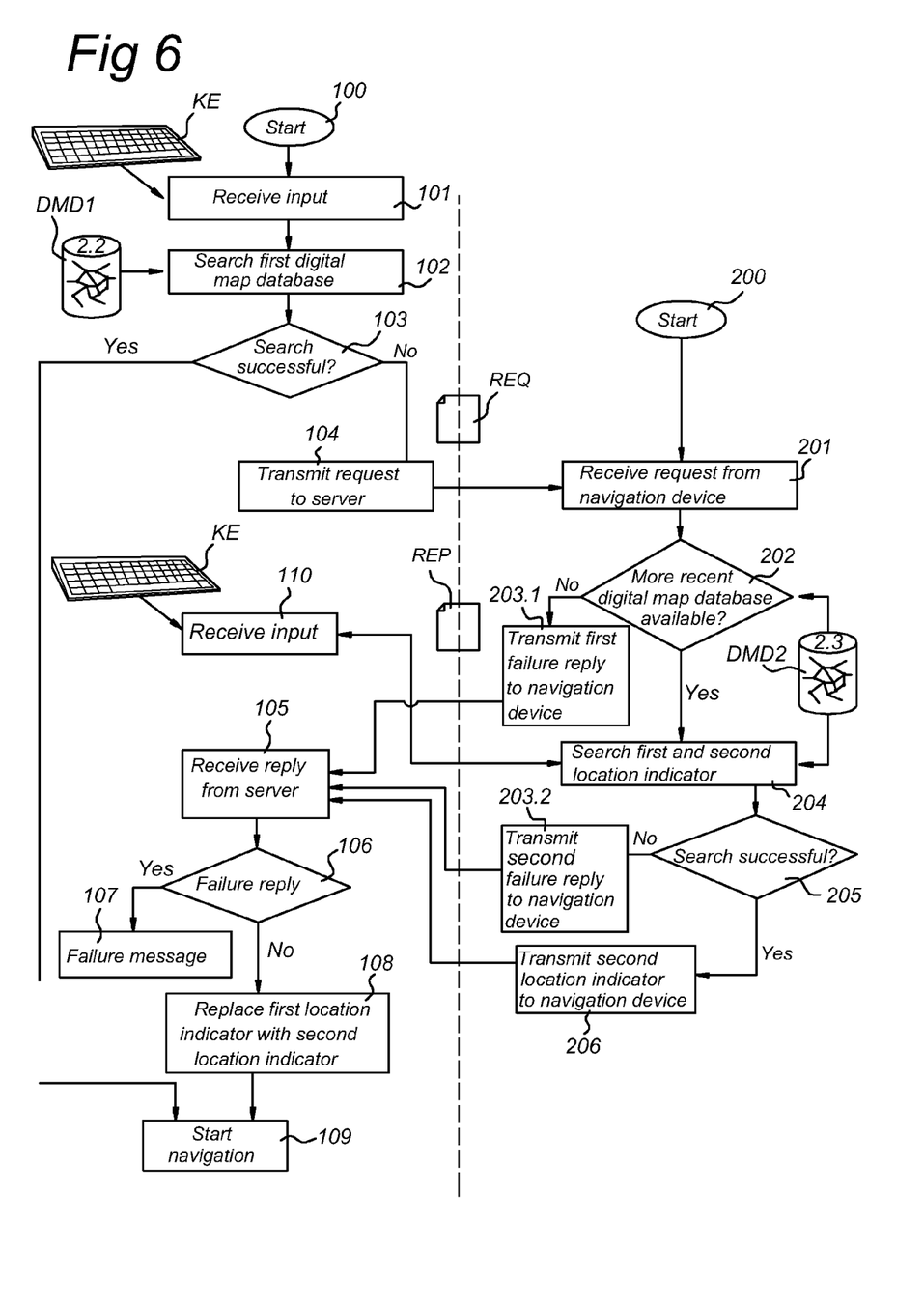
FIG. 6 depicts a flow diagram according to a further embodiment.

According to an embodiment, the search for the first location indicator as performed by the server SE is done in an interactive way with the user. FIG. 6 schematically depicts a flow diagram of such an embodiment. The same reference numbers are used for the same elements as in FIG. 5. FIG. 6 shows that the search for the first location indicator is done in interaction with the navigation device ND, which is shown by the double arrow between action 204 and action 110, in which the navigation device ND is arranged to receive input from the user, for instance via the keyboard KE.

The navigation device ND usually does not need to receive the complete first location indicator from the user before it is clear that the first location indicator is not present in the first digital map database. At this moment, a request may be sent to the server SE. The request may comprise the partially entered first location indicator. In action 205, the server SE may send a list of possible options back to the navigation device ND, which are presented to the user. The characters inputted by the user are sent to the server SE, in response to which the server provides an updated list to the navigation device ND. This allows the user to effectively search for the first location indicator in the second digital map database.

It will be understood that the interaction may be done in different ways. According to an embodiment, the user enters all the information he/she knows and the server SE returns a list (possibly containing only possible just one entry) of possible matches, from which the user may select one. According to an alternative, the server SE sends a list of possible matches to the navigation device ND, which is constantly updated once the user enters a new character. The user can scroll through the list (up and down) and select a location indicator. If the top or bottom of the list is reached, the navigation device transmits a request to the server SE to fill up the list.

It will be understood that the navigation device ND may be arranged to receive input from the user in many different ways, such as by receiving input from a microphone, in which the user has pronounced the name of the destination or receive input from a touch screen. The touch screen may for instance display (part of) the first digital map database DMD1, and the location touched by the user is an indication of the desired first location indicator. The request transmitted to the server SE may comprise longitude and/or latitude information, corresponding to the location in the first digital map database touched by the user.

From the above, it will be understood that interactive search as described here may be performed in many different ways.

It will also be understood that although the embodiments focus on a situation in Which a street is missing in the first digital map database DMD1, the embodiments may also be employed for situations in which other information is missing, such as a street address range, POI's etc. When a user searches for a POI, queries like: "find me the closest POI of a given category (e.g. restaurants)" may be used. The embodiments described here may be used when such a search doesn't provide satisfying results. So, when the user is of the opinion that the closest restaurant is not close enough, or has knowledge of an alternative restaurant that is not found, the user may initiate the navigation device ND to send a request to the server. The navigation device ND may also send such a request when no restaurant is found within a predetermined range. According to an alternative, the navigation device ND may always send such a request to be sure that up-to-date results are provided.

According to a further embodiment, the server SE may select more than one possible second location indicator. For instance, in the situation described with reference to FIGS. 4a, 4b and 4c, the server SE may decide to return street A and street B as second location, and give the navigation device the option to decide which of these two is most convenient to use. This may for instance depend on the current position of the user. The navigation device ND may compute a route to both second locations, and decide based on estimated travelling times, which second location will be used. According to an alternative, the request from the navigation device ND to the server SE comprises the current position of the navigation device ND allowing the server SE to choose between street A and Street B.

Additional Navigation Information

The reply from the server SE to the navigation device ND comprising the second location may further comprise additional navigation information that may be presented to the user to help the user to travel from the second location to the first location, riot being stored in the first digital map database DMD1 stored on the navigation device.

According to an embodiment, the additional navigation information may be so-called dead reckoning navigation information. The dead reckoning navigation information may for instance explain to the user that the first location is 200 metres in the northern direction from the second location. This dead reckoning navigation information may be presented to the user as a spoken message and/or a message displayed on the display DI of the navigation device ND.

According to a further embodiment, the additional navigation information may comprise information about at least one of a distance as the crow flies, a travelling distance and a travelling time from the first location to the second location.

According to a further embodiment, the additional navigation information may comprise a navigation instruction how to travel from the second location to the first location. The navigation instruction may be one simple message spoken or displayed to the user once the second location is reached. This navigation instruction may for instance be: To reach your destination, turn right after 100 metres, then turn left after 50 metres.

According to a further embodiment, the additional navigation information may comprise one or more navigation instructions how to travel from the second location to the first location. The one or more navigation instructions may have positional information (longitude/latitude information) associated with it, allowing the navigation device to play and/or display the correct navigation instruction at the correct position, despite the fact that the first digital map database DMD1 does not comprise up-to-date information about the area in between the first and second location.

According to a further embodiment, the additional navigation information may comprise a pixel image or map data that may be displayed on the display DI of the navigation device ND helping the user to navigate to the first location. This pixel image or map data may also comprise positional information (e.g. longitude/latitude information) allowing the navigation device ND to show a particular part of the pixel image or map data based on the current position of the navigation device. This embodiment may very well be combined with the embodiment, in which the additional navigation information comprises one or more navigation instructions, possibly comprising position information.

It is to be noted that the pixel image and the map data that are sent to the navigation device as additional navigation information are not incremental updates of the first digital map database DMD1. The pixel image and the map data that are sent to the navigation device as additional navigation information are not integrated in tied to the first digital map database DMD1 and also is not necessarily stored in the first digital map database DMD1 after been used to navigate to the first location.

According to a further embodiment, the navigation device ND knows beforehand if a more up-to-date second digital map database is present at the server SE. This may for instance be accomplished by sending a message to the navigation device ND informing the navigation device ND that a more up-to-date second digital map database DMD2 is now available at the server SE. As long as the navigation device ND did not receive such a message, it may not send requests to the server SE. This may make actions 202 and 203.1 unnecessary and prevents the user from being faced with additional promises and corresponding failures.

It will be understood that the above embodiments may also be of value in situations that the first digital map database DMD1 is no longer up-to-date in the sense that a street, a POI or the like has been given a new name. A user searching the first digital map database DMD1 stored in the navigation device ND using the new name will not receive a satisfying result. The navigation device ND may therefore send a request comprising the new name to the server SE as described above.

The server SE will find the new name in the second digital map database DMD2 and accordingly search for a nearby second location comprised by the first digital map database DMD1 that is returned to the navigation device ND as alternative destination. In this situation, the user will be guided to the second location, although the first location is in fact comprised by the first digital map database DMD1, but has a different name. However, this will be more satisfying for the user than not finding any location at all.

In case the server SE has a copy of the first digital map database DMD1 available, it may search it to find the old name. It may then return the old name to the navigation device ND. In this case, the second location (old name) happens to be at the same location as the first location (new name). For this reason, the server SE may also comprise a second digital map database DMD2 comprising history of changes.

Based on the above it will be understood that the problem of outdated digital map databases is not solved by updating the digital map database, but by searching for the missing location on a more recent digital map database and a nearby location present in the outdated map is being used as an alternative. In this way, the navigation device ND will be able to guide the user to his/her destination or at least give him/her a sufficiently close approximation which in practice will be much better than nothing.

For the purpose of teaching the invention, preferred embodiments of the method and devices of the invention were described. It will be apparent for the person skilled in the art that other alternative and equivalent embodiments of the invention can be conceived and reduced to practice without departing from the true spirit of the invention, the scope of the invention being only limited by the annexed claims.

The invention claimed is:

1. Method for determining, by a processor, a location in a first digital map database based on a query, the method comprising:
receiving, by the processor, a request including a query for a first location;
searching, by the processor, for the first location in the first digital map database-based upon the received query;
searching, by the processor, upon the first location not being found within the first digital map database, for the first location in a second digital map database;
searching, by the processor, in the second digital map database, upon the first location being found within the second digital map database, for a second location proximate to the first location, the second location being included in the first digital map database; and
providing, by the processor, upon the second location being found, the second location as a response to the query.

2. Method according to claim 1, wherein the request is received from a navigation device, and wherein the providing further comprises:
transmitting a reply to the navigation device including the second location, upon the second location being found.

3. Method according to claim 1, wherein the searching for the second location includes performing a spatial search for the second location proximate to the first location, taking into account a distance between the first and the second location as the crow flies.

4. Method according to claim 1, wherein the searching for the second location includes performing a topological search for the second location proximate to the first location, taking into account at least one of a travelling distance and a travelling time between the first and the second location.

5. Method according to claim 1, wherein the request further comprises a first version indicator of the first digital map database and wherein the first version indicator is used to determine if the second location proximate to the first location is included within the first digital map database.

6. Method according to claim 5, wherein, in the second digital map database, a plurality of locations include associated version indicators, indicating in which version of at least one of the first and the second digital map databases such a location was first added to at least one of the first and the second digital map databases, and wherein the version indicators of the plurality of locations are used to determine if the second location proximate to the first location is included within the first digital map database.

7. Method according to claim 5, wherein a copy of the first digital map database is used to determine if the second location proximate to the first location is included within the first digital map database.

8. Method according to claim 5, wherein a second version indicator is associated with the second digital map database, and wherein the method further comprises: determining if the second digital map database is more up-to-date than the first digital map database based on comparing the first and second version indicators, and upon the second digital map database not being more up-to-date than the first digital map database, generating a first failure reply.

9. Method according to claim 1, further comprising:
computing navigation information for navigating from the second location to the first location.

10. Method according to claim 9, wherein the navigation information comprises at least one of a distance as the crow flies, a travelling distance, a travelling time from the first location to the second location, one or more navigation instructions, a pixel image and map data.

11. Method according to claim 1, wherein the query comprises at least one of: a street, a house number, a POI, and a POI-category.

12. Method according to claim 1, wherein the request further comprises a first version indicator of the first digital map database.

13. Server for determining a location in a first digital map database based on a query, the server comprising:
a second digital map database stored in a memory associated with the server;
at least one communication device to communicate with remote devices, wherein the server is arranged to:
receive a request including a query for a first location via the at least one communication device, the first location not being included within the first digital map database, search for the first location in a second digital map database, the second digital map database being stored in the memory associated with the server, and
search, upon the first location being found in the second digital map database, search for a second location proximate to the first location, the second location being included within the first digital map database.

14. A non-transitory computer readable medium including program segments for, when executed on a computer device, causing the computer device to implement the method of claim 1.

* * * * *